Sept. 29, 1942.　　P. L. STEFFENSEN　　2,297,586
AERATING MACHINE
Filed July 3, 1940
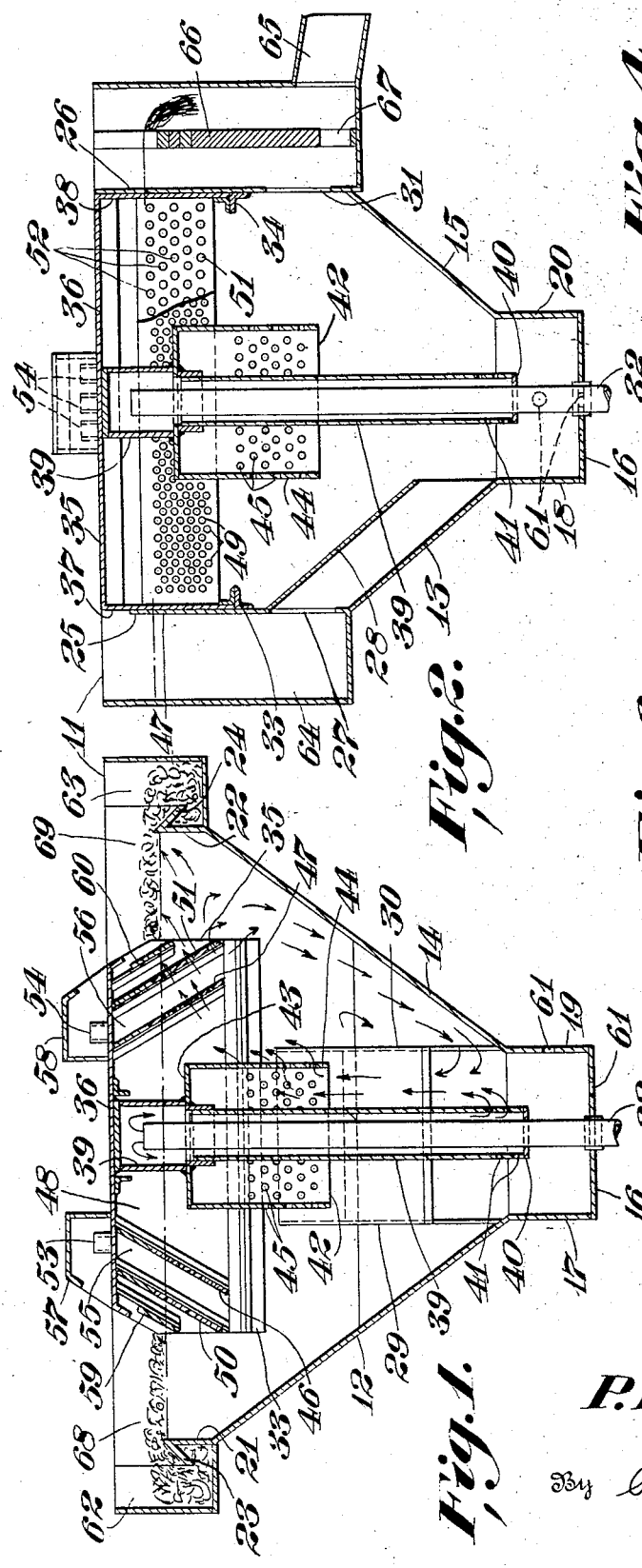
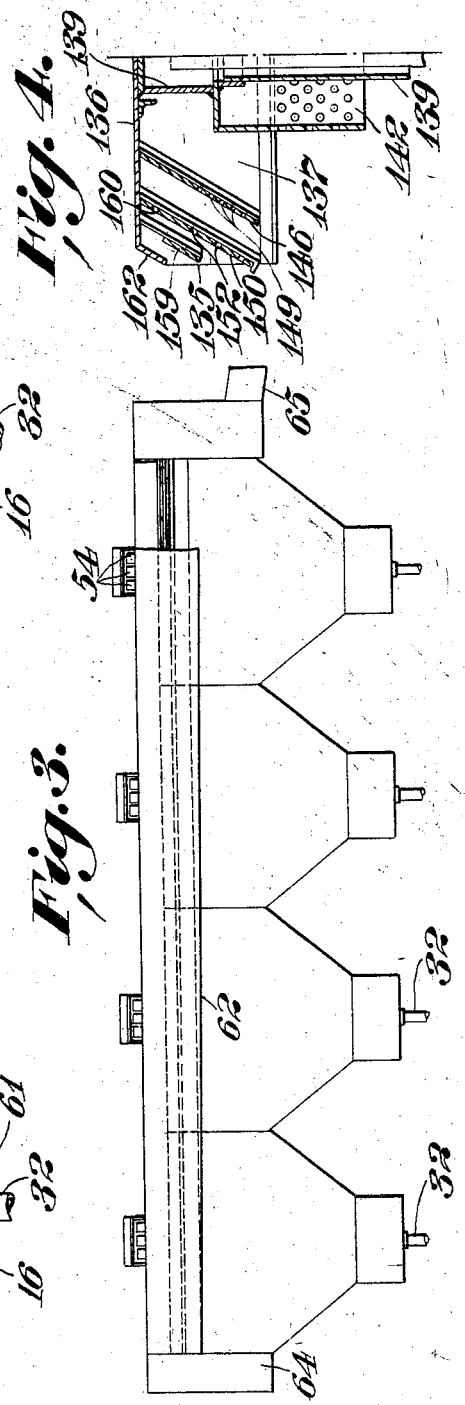
Inventor
*P. L. Steffensen.*
By *R. S. A. Dougherty.*
Attorney Patented Sept. 29, 1942

2,297,586

UNITED STATES PATENT OFFICE 2,297,586

AERATING MACHINE

Percy Lea Steffensen, Cornwall, Pa., assignor to Bethlehem Steel Company, a corporation of Pennsylvania Application July 3, 1940, Serial No. 343,811

10 Claims. (Cl. 209—170)

My invention relates to improvements in the concentration of ores by the flotation process, in which air is introduced into pulp composed of water, finely divided ore and a suitable reagent or reagents, thereby agitating the mixture and producing a froth which contains a high percentage of the mineral being recovered and which is then separated from the main body of material being treated.

It is an object of my invention to provide a cell or chamber for carrying out said process having such configuration that substantially the entire body of pulp therein is subjected to aeration and agitation.

A further object of my invention is to provide a flotation cell which may be coupled to one or more similar cells to provide a string of cells in series.

A further object of my invention is to provide a series of flotation cells which may be operated with little or no loss of head between adjacent cells, thereby effecting a saving in the amount of power necessary to supply pulp to the apparatus.

A further object of my invention is to provide a flotation cell wherein material which is relatively coarse or of relatively high specific gravity may be effectively separated by flotation.

A further object of my invention is to provide a flotation cell in which the pulp is forced upwardly and outwardly from the bottom of the cell to froth collecting zones at the sides of the cell.

A further object of my invention is to provide in a flotation cell an arrangement of baffles such that the pulp and mineral bearing froth may pass therethrough without losing a substantial part of the values to be recovered.

Other objects of my invention will be apparent from the following detailed description thereof and from the drawing in which Figure 1 is a vertical section of the cell;

Figure 2 is a vertical section along the line 2—2 of Figure 1;

Figure 3 is a view in elevation and of a plurality of cells arranged in series; and Figure 4 is a vertical section showing a modified arrangement of the baffles and air vents.

Referring to Figures 1 and 2, my apparatus comprises a rectangular cell 11 having upwardly and outwardly diverging sidewalls 12, 13, 14 and 15. The base of the cell comprises the rectangular bottom plate 16 and the vertically extending side plates 17, 18, 19 and 20. The sidewalls 12 and 14 extend outwardly and upwardly substantially to the top of the cell and terminate with the short vertical extensions 21 and 22 and froth lips 23 and 24. The end walls 13 and 15 terminate substantially short of the top of the cell in the vertically disposed end walls 25 and 26. The entering side of the cell is provided with the laterally disposed rectangular opening 27. A hood comprising the top 28 and the sidewalls 29 and 30 is provided to direct the incoming feed to the bottom of the cell. The exit side of the cell is provided with a laterally disposed rectangular opening 31.

Extending upwardly through the bottom 16 of the cell is the air inlet pipe 32 which is connected at its outer end to a source of compressed air not shown.

The end walls 25 and 26 are provided with the brackets 33 and 34 to which the hood 35 is removably secured.

The hood 35 comprises the top plate 36, the end plates 37 and 38 and a plurality of baffles to be hereinafter described.

Depending from the top plate 36 is the cylinder 39 which surrounds the air inlet pipe 32 and is secured to plate 43. Below said plate the diameter of cylinder 39 is slightly restricted. Cylinder 39 terminates at 40 above but near the bottom of the cell. The said cylinder 39 is provided at its lower end with a plurality of openings 41 of small diameter which permit the egress of air into the cell.

Secured to and surrounding the cylinder 39 is the bell 42 which is of rectangular form but may also be of cylindrical form and which comprises a top plate 43 and sides 44. The lower end of the bell 42 extends substantially below the normal level of pulp in the cell. The sides 44 of the bell are provided with a plurality of openings 45 which are disposed below the normal level of pulp in the cell.

Depending from the top plate 36 and extending longitudinally of the cell are the downwardly and outwardly extending baffles 46 and 47 which together with the top plate 36 and end plates 37 and 38 form a closed chamber 48. The lower ends of baffles 46 and 47 project into the pulp and are provided with a plurality of openings 49 most of which are disposed below the normal pulp level in the cell.

Extending parallel to baffles 46 and 47 are a second pair of baffles 50 and 51 which extend into the pulp and are provided with openings 52 most of which are disposed below the normal pulp level in the cell.

Vent pipes 53 and 54 lead from chambers 55 and 56 to the atmosphere and are provided with the splash plates 57 and 58. Additional splash plates 59 and 60 are provided outside the baffles 50 and 51.

At the bottom of the cells one or more openings 61 may be provided through which air under high pressure from a source not shown may be introduced into the cell in the event that it becomes clogged by heavy or coarse sand.

Extending longitudinally of the cell are launders 62 and 63 which are of well known construction.

The pulp enters the cell through the duct 64 which is of standard construction. At the exit end of the cell the tailings are discharged into the conduit 65. An adjustable wier 66 is provided to control the level of pulp in the cell. Heavy sands pass through the sand hole 67.

The operation of the cell is as follows: pulp is introduced into the cell to a level slightly below that of the froth lips 23 and 24. Air under suitable pressure which may be of the order of two to three pounds per square inch is introduced into the inlet pipe 32 and passes downwardly through the space between pipe 32 and cylinder 39 and outwardly through openings 41 where it intermingles with the pulp in the form of bubbles. The air streams, passing through holes 41 into the pulp, to which suitable frothing and collecting reagents have been added, rise therethrough and form bubbles on the surface of which bubbles are collected a certain amount of the desired mineral in a more or less clean state. The pulp bubbles and surplus air rise into the bell 42 and are forced outwardly through the openings 45 and continuing to rise, come to the baffles 46 and 47, where most of the bubbles and air and part of the pulp pass through holes 49 into chambers 55 and 56. As noted hereinbefore, vent holes 53 and 54 permit surplus air to escape at this point to the atmosphere while the bubbles in the form of a mineral bearing froth contaminated with a certain amount of non-mineral froth pass through the openings 52, under splash plates 59 and 60, and into the zones 68 and 69. The froth is allowed to float over the edges of the froth lips 23 and 24 or may be removed by means of skimmers not shown.

The multiplicity of baffles, as well as the shape and depth of the cell, provide for very active agitation of the pulp where the bubbles are formed and the mineral particles are collected, and also provide for a gradual quieting of said agitation to the point where the froth collects and discharges. This facilitates the collection of mineral particles and enables the non-mineral portion of the pulp as well as mineral particles not so easily floated to drop out and be recirculated or pass on to other cells for retreatment.

The flow of the pulp in the cell is illustrated by means of arrows since important results are dependent upon the manner in which the flow is controlled. It will be seen that the pulp and entrained air entering bell 42 are forced laterally through the openings 45. This lateral motion combined with the buoyancy of the air carries the mixture upwardly and outwardly towards baffles 46 and 47.

As heretofore described these baffles are disposed at an angle to the perpendicular, which angularity has an important effect upon the action of the mixture of air and pulp. The bubbles carrying mineral particles, on account of their buoyancy, tend to rise through the restricted openings 49 in the inclined baffles 46 and 47 thereby crowding out the non-floating pulp which tends to settle out of the stream. The same action takes place at baffles 50 and 51 as the froth passes through openings 52 and into zones 68 and 69, from which the froth is removed.

It will be seen from the foregoing description that following the initial lift of the pulp into the bell 42 the movement of the air and pulp mixture is all in an upward and outward direction towards the sides of the cells from which the froth is removed. Because of the absence of vertical baffles with horizontal holes, through which it would be difficult for the mineral laden bubbles to pass, the movement of the mineral values to the point of discharge and the separation of these values from the non-floating gangue portion of the pulp are facilitated. Naturally a certain amount of material will drop to the bottom of the cell before it can be entrained in the froth and removed into the launders, but the proportion of such material is considerably less than in flotation cells hitherto known.

Figure 4 shows a modification of my design in which a different arrangement is provided for venting the chambers formed by the baffles. As illustrated in said figure, the hood 135 is provided with the top plate 136 and end plates, of which only the end plate 137 is shown. The cylinder 139 is provided, which surrounds the air inlet pipe, not shown, while the bell 142 is secured to, and surrounds, cylinder 139. Downwardly and outwardly extending baffles 146 and 150 depend from the top plate 136, and are provided with openings 149 and 152, respectively. Splash plate 159 is provided outside the baffle 150. In lieu of providing a vent pipe to carry off the excess air from the space between baffles 146 and 150, baffle 150 is provided at its upper end with a plurality of openings 160 which lead into the space between baffle 150 and splash plate 159. Likewise, the upper edge of splash plate 159 terminates at 161 short of top plate 136 thereby permitting free egress of air from the space between baffles 146 and 150 into the surrounding atmosphere. In order to prevent spray being carried into the atmosphere, an additional splash plate 162 is provided to cover the opening at the upper side of splash plate 159.

The arrangement of splash plates shown in Figure 4 leaves the top of the cell entirely clear of equipment.

Although in Figures 1 and 2 I have shown the air inlet pipe 32 extending upwardly through the bottom 16 of the cell, and an outer cylinder 39 which carries the air downwardly to a point near the bottom of the cell, I do not wish to be limited to such a construction since my invention also contemplates a construction in which the air inlet pipe is introduced through the top of the cell and terminates at or near the bottom of the cell.

The circuit which the pulp and air follows in my cell renders the cell particularly advantageous in the flotation of ores which are comparatively coarse or of high specific gravity. Thus, we have been able to successfully treat in a line of flotation cells of this type a magnetic iron concentrate which, over a year's operation, averaged 59.89% iron and 0.499% copper. The average sizing test of this feed, which was treated without regrinding, was

|  | Per cent |
|---|---|
| Plus 48 mesh | 17.2 |
| Minus 48 mesh, plus 65 mesh | 8.2 |
| Minus 65 mesh | 74.6 |

The satisfactory commercial flotation of this high specific gravity feed, about 83% of which is magnetite, having a specific gravity of 4.9 to 5.2, and with more than 25% of the feed coarser than 65 mesh, will indicate the capabilities of the cell, since such material had been considered incapable of flotation prior to my invention.

The contour of the cell itself is of importance in connection with the flotation of both coarse, high gravity material and ordinary feeds. As hereinabove described, the cell tapers on all sides to a small bottom directly under the air inlet. The effect of such tapering is to eliminate dead spaces in the cell in which the ore can settle and thus clog the apparatus. In previously known types of cells, where a plurality of air inlets are employed, one or more air inlets may become completely clogged without any indication of such clogging becoming apparent to the operator of the cell.

The elimination of dead spaces is of course extremely important in treating coarse, high gravity material where the tendency toward clogging is increased.

Although I have shown the bottom of the cell as comprising the plate 16 and the side plates 17, 18, 19 and 20, it will be understood that it is not essential so to truncate the cell. That is to say, the cell may be continued downward to a point; or, if desired, the plates 17, 18, 19 and 20 may be eliminated and the bottom plate attached directly to the sides 12, 13, 14 and 15.

In the figures, I have illustrated the bottom plate 16 of the cell as secured to the side walls by the plates 17, 18, 19 and 20. The function of the pocket thus formed is to minimize the abrasive action of the pulp upon the material of which the cell is constructed. In operation a certain amount of sand settles into the pocket and acts as a cushion against the pulp circulating above the bottom of the cell. This is an extremely desirable feature in the flotation of coarse, high gravity material. It will be understood that this feature is not limited in its application to cells of the configuration shown in the figures but is applicable to flotation cells generally.

As hereinbefore described, the tapering end walls 13 and 15 of the cell terminate substantially short of the top of the cell in the vertical portions 25 and 26. The discharge opening 31 is located immediately above the junction of the walls 15 and 26. Figure 3 shows a plurality of cells in series, the inlet opening of each cell after the first registering with the discharge opening of the preceding cell.

By so elevating the discharge opening of the cell it is possible to arrange a plurality of cells in series without losing the head of the feed supply, thus conserving power and space. This saving is made possible through the fact that the pulp in the cell is thoroughly agitated throughout its mass whereby the heavy unfloatable sands are elevated to the level of the discharge opening and gradually flow therethrough. The number of cells which may be connected in series as above described is not limited physically, but will, of course, depend upon the economy of reworking the tailings from the preceding cell.

In treating certain ores it may be possible that improved results will be obtained if the pulp is first subjected to a mechanical agitation, thereby thoroughly mixing and distributing the reagents throughout the pulp and providing time for their reaction on the minerals of the pulp before it enters the air flotation cells. This may be accomplished in a separate agitating machine or mechanically agitated flotation cells may be employed at the head of a circuit followed by air cells of my design which would then act as secondary units or as scavengers. It is, of course, possible to introduce additional reagents of the same or different types as may be desired after the mechanical agitation and before the pulp enters the air cells or into any cell in a line.

Having thus described my invention, what I claim as new and desire to secure by Letters Patent is:

1. Ore flotation apparatus comprising a cell having substantially the outline of an inverted frustrum of a pyramid, means for introducing air into the cell near the bottom thereof, an inverted bell disposed above said means having its lower edge below the normal level of the pulp in the cell to entrap air introduced into the cell through said means, a plurality of openings in the walls of said bell to permit the flow of air and pulp therethrough, a chamber open at its lower end disposed above said bell and having a pair of downwardly diverging sidewalls forming a pair of baffles, openings in said baffles disposed below the normal level of pulp in the cell, and a second pair of downwardly diverging baffles disposed outside of said first pair of baffles and in spaced relation thereto and having openings therein disposed below the normal level of pulp in the cell, the spaces outside said first pair of baffles and inside said second pair of baffles being open to the atmosphere to permit the venting of excess air.

2. Ore flotation apparatus comprising a cell having substantially the outline of an inverted frustrum of a pyramid, means for introducing air into the cell near the bottom thereof, an inverted bell disposed above said means having its lower edge below the normal level of the pulp in the cell to entrap air introduced into the cell through said means, a plurality of openings in the walls of said bell to permit the flow of air and pulp therethrough, a chamber open at its lower end disposed above said bell and having a pair of downwardly diverging sidewalls forming a pair of baffles, openings in said baffles the majority of which are disposed below the normal level of pulp in the cell, and a second pair of downwardly diverging baffles disposed outside of said first pair of baffles and in spaced relation thereto and having openings therein the majority of which are disposed below the normal level of pulp in the cell.

3. Apparatus for the separation of minerals by flotation comprising a cell of inverted, substantially pyramidal outline, means for introducing air into the cell near the bottom thereof, an inverted bell disposed above said means and extending below the normal pulp level in the cell to entrap air introduced into the cell through said means, a plurality of openings in the walls of the bell to permit the flow of air and pulp therethrough, a chamber open at its lower end above said bell having sidewalls which diverge downwardly into the pulp and towards the sides of the cell, a plurality of openings in said sidewalls below the normal pulp level in the cell, a baffle disposed parallel to and outside of each of said sidewalls and openings therein disposed below the normal pulp level in the cell, and means for venting the spaces formed between said sidewalls and said baffles.

4. Apparatus for the separation of minerals by flotation comprising a cell, means for introducing air into the cell near the bottom thereof, an inverted bell disposed above said means and extending below the normal pulp level in the cell to entrap air introduced into the cell through said means, a plurality of openings in the walls of the bell to permit the flow of air and pulp therethrough, a chamber open at its lower end above said bell having sidewalls which diverge downwardly into the pulp and towards the sides of the cell, and a plurality of openings in said sidewalls below the normal pulp level in the cell, and means for venting excess air from said chamber.

5. Apparatus for the separation of minerals by flotation comprising a cell, means for introducing air into the cell near the bottom thereof, a bell disposed above said means and extending below the normal pulp level in the cell to entrap air introduced into the cell through said means, a plurality of openings in the walls of the bell to permit the flow of air and pulp therethrough, a chamber open at its lower end above said bell having sidewalls which diverge downwardly into the pulp and towards the sides of the cell, and a plurality of openings in said sidewalls the majority of which are below the normal pulp level in the cell, and means for venting excess air from said chamber.

6. Apparatus for the flotation of materials, comprising a cell adapted to contain the material to be floated, means for introducing air into said cell near the bottom thereof, a hood having sidewalls adapted to extend beneath the pulp level, and spaced baffles within the hood extending between the sides of the hood to constitute an inner hood, said baffles being perforated at their lower extremities to permit the aerated material to pass therethrough, and means for venting excess air from the spaces defined by said baffles and the sidewalls of said hood.

7. Apparatus for the flotation of materials, comprising a cell adapted to contain the material to be floated, means for introducing air into said cell near the bottom thereof, a hood having sidewalls adapted to extend beneath the pulp level, and spaced downwardly diverging baffles within the hood extending between the sides of the hood to constitute an inner hood, said baffles being perforated at their lower extremities to permit the aerated material to pass therethrough, and means for venting excess air from the spaces defined by said baffles and the sidewalls of said hood.

8. Apparatus for the flotation of materials, comprising a cell adapted to contain the material to be floated, means for introducing air into said cell near the bottom thereof, a hood, a pair of baffles positioned within said hood to constitute a first inner hood, and a pair of baffles within the first inner hood to constitute a second inner hood, certain of said baffles being perforated adjacent the lower edges thereof to permit the aerated materials to pass therethrough, and means for venting excess air from the spaces defined by said baffles and the sidewalls of said hood.

9. Apparatus for the flotation of materials, comprising a cell adapted to contain the material to be floated, means for introducing air into said cell near the bottom thereof, a hood, a pair of baffles positioned within said hood to constitute a first inner hood, ducts within said first inner hood for communicating the interior thereof with the atmosphere, and a pair of baffles within the first inner hood to constitute a second inner hood, certain of said baffles being perforated adjacent the lower edges thereof to permit the aerated material to pass therethrough.

10. Apparatus for the flotation of materials, comprising a cell, a duct for leading air from the bottom of the cell to a point above the pulp level in the cell, a duct surrounding said first duct for leading air to a point adjacent the bottom of the cell, openings in said second duct adjacent the bottom thereof, an inverted bell positioned above said openings and having perforations in its sidewalls to permit the escape of air introduced into the cell through said openings, an inverted hood positioned above said bell having side walls extending below the pulp level, a pair of baffles within said hood constituting a first inner hood, a pair of baffles within said first inner hood in spaced relation to said first mentioned pair of baffles and constituting a second inner hood, perforations in certain of said baffles adjacent the lower edges thereof and ducts between said pairs of inner and outer baffles for communicating the spaces formed thereby with the atmosphere.

PERCY LEA STEFFENSEN.